July 10, 1962     O. JENSEN     3,044,005

PROTECTION OF MERCURY ARC RECTIFIER

Filed Sept. 18, 1957

INVENTOR.
OTTO JENSEN

BY Ostrolenk, Faber,
Gerb & Soffen
ATTORNEYS

United States Patent Office 3,044,005
Patented July 10, 1962

3,044,005
PROTECTION OF MERCURY ARC RECTIFIER
Otto Jensen, Malvern, Pa., assignor to I-T-E Circuit Breaker Company, Philadelphia, Pa., a corporation of Pennsylvania
Filed Sept. 18, 1957, Ser. No. 684,777
2 Claims. (Cl. 321—12)

My invention relates to the use of a saturable type reactor in each anode lead of a mercury arc rectifier wherein the saturable reactor unsaturates responsive to reversal of anode current to maintain the anode current at a relatively small value for a predetermined time and to deliver a signal for initiating operation of a current interrupter which may be of the exceedingly fast operating type.

The use of saturable reactors or so called step-reactors in the D.-C. conducting portions of rectifier systems are well known in the art, and are set forth in copending application Serial No. 597,781, filed July 13, 1956, now Patent No. 2,949,568, to Dortort entitled "Protection of Parallel Connected D.-C. Sources," and assigned to the assignee of the instant application.

In principle, the step-reactor is placed in a D.-C. conducting portion of the rectifier such as one of the output conductors, and the reactor is saturated in the forward direction so long as the rectifier current conditions are normal. When, however, there is a backfire or arc-back, the D.-C. current decreases from its normal value and attempts to reverse. During this reversal, the step-reactor unsaturates, and the current is held to an extremely small value for as long a time as is taken for the reactor to unsaturate in the opposite direction.

The unsaturation of the step-reactor may serve to initiate the operation of series connected interrupters which may operate during the low current step interval. However, even if the series interrupters operate outside of the step, they will interrupt a smaller current than they would in the absence of the step since the steps delays the time at which current can increase in the negative direction.

I have found that by providing step-reactors for each anode of a mercury arc rectifier, that I achieve new and obvious results that would not be apparent to those skilled in the use of step-reactors.

Mercury arc rectifiers as presently used, are equipped with high speed anode breakers in each anode lead which operate to interrupt fault current within approximately one-fourth of a cycle. However, when there is a backfire in one particular anode (the reverse current in that anode circuit consisting of the fault current as well as the current drawn from other parallel connected rectifier systems), may have a rate of rise of 16,000,000 amperes per second. Hence, the anode current may reach a value of 65,000 amperes before the ¼ cycle anode breaker operates. This extremely high current may cause the destruction of the backfiring circuit, and may cause parallel connected rectifiers to be taken off the line in view of the excessive current they supply to the backfire. Furthermore, the high current causes severe stresses in the transformer windings and the rectifier tanks.

Because of the above conditions, it has become the practice when designing mercury arc rectifiers to substantially underrate them, and further, to have a greater arc drop than is needed for a particular installation. Accordingly, mercury arc rectifiers cannot be used at their full capacity and their efficiency is purposely decreased because their arc drop voltage is increased.

I have found, that by connecting step-reactors in each anode lead of a mercury arc rectifier, and operating each step reactor in conjunction with an associated high speed circuit breaker, that I can increase the rating of a given mercury rectifier, and I can further increase the efficiency of a mercury arc rectifier by using a lower arc drop voltage for a particular application.

My device is particularly useful when used in conjunction with extremely high speed contactors of the type set forth in copending U.S. application Serial No. 677,631, filed August 12, 1957, to Jensen entitled Explosive Type Short Circuiter, and assigned to the assignee of the instant invention. When using this type of high speed circuit interrupter, circuit interruption can be easily achieved within the step produced by its associated step-reactor. Therefore, the interrupting duty on the circuit interrupter is substantially decreased and no arc chute is required.

Accordingly, a primary object of my invention is to provide a step-reactor for mercury arc rectifiers.

Another object of my invention is to insert a step reactor in each anode lead of a mercury arc rectifier.

Another object of my invention is to connect a reactor in each anode lead of a mercury arc rectifier and coordinate the operation of said reactor with a series connected high speed circuit interrupter.

A still further object of my invention is to provide a novel system for mercury arc rectifier which allows an increase in their efficiency and allows them to be operated at a greater capacity.

These and other objects of my invention will become more apparent from the following description when taken in conjunction with the drawings in which.

Figure 1:
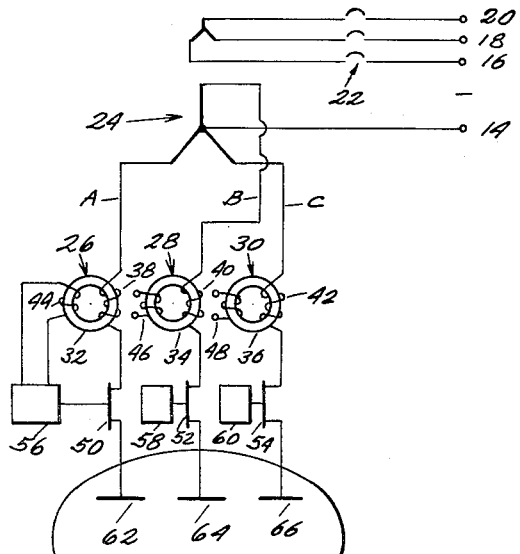
FIGURE 1 shows a schematic diagram of a three phase, half wave mercury arc rectifier as adapted with my novel invention.

Referring now to FIGURE 1, the three phase, half wave mercury arc rectifier shown generally at numeral 10 supplies D.-C. potential to positive output terminal 12, and negative output terminal 14 from a three phase A.-C. system connected at terminals 16, 18 and 20. It is to be noted that the rectifier system of FIGURE 1 is shown as a half wave system for illustrative purposes only, and that my novel invention could be applied to any type mercury arc system.

The A.-C. source is connected through the A.-C. circuit breaker 22 and to the rectifier transformer 24. Transformer 24 includes a Y connected secondary winding the neutral of which is taken out to the negative D.-C. terminal 14.

Each A.-C. secondary phase A, B and C is then connected to a respective reactor 26, 28 and 30. Reactors 26, 28 and 30 are comprised of magnetic cores 32, 34 and 36 respectively (which are preferably, although not necessarily constructed of highly saturable material), main winding 38, 40 and 42 respectively and auxiliary windings 44, 46 and 48 respectively.

Each phase further contains a high speed anode circuit breaker schematically shown as circuit breakers 50, 52 and 54 respectively having energizable operating means 56, 58 and 60 respectively. Since anode breakers 50, 52 and 54 and their respective operating means 56, 58 and 60 are well known in the art, they will not be further described herein. However, I have found it particularly desirable to use the type of interrupter set forth in my copending U.S. application Serial No. 677,631 filed August 12, 1957, to Otto Jensen entitled Explosive Type Short Circuiter for the anode circuits.

The auxiliary windings 44, 46 and 48 of each of phases A, B and C respectively are then connected to operating means 56, 58 and 60 respectively whereby the operating means will be energized to operate its respective contacts responsive to the appearance of a voltage on the respective reactor auxiliary winding. For purposes of simplicity, only the connection for phase A is shown, the connections for phases B and C being identical to that shown for phase A.

Each of phases A, B and C are then connected to the arc rectifier anodes 62, 64 and 66 which are housed within an evacuated housing 68. The mercury arc rectifier is then completed by the mercury pool 70 which forms the cathode of the rectifier. It is to be understood that only the portions of the mercury arc rectifier which are needed to describe my invention are shown in FIGURE 1. Thus, many details of a mercury arc rectifier structure are not set forth herein. Among some of the omitted features would be the keep alive structure for maintaining a cathode spot on the mercury pool cathode, control electrodes, shielding and so on.

The cathode 70 of mercury arc rectifier 10, is then connected through a step reactor 72. Step reactor 72 is of the well known type which is connected in the D.-C. output lead of a rectifying system as shown in copending U.S. application, Serial No. 597,781, now Patent No. 2,949,-568, and includes a trip winding 74 which is operatively connected to the tripping mechanism 76 of the circuit breaker 78. The operation of the step reactor 72 and its associated circuit breaker 78 is fully set forth in above noted copending U.S. application, Serial No. 541,709 and will not be further described herein.

Figure 2:
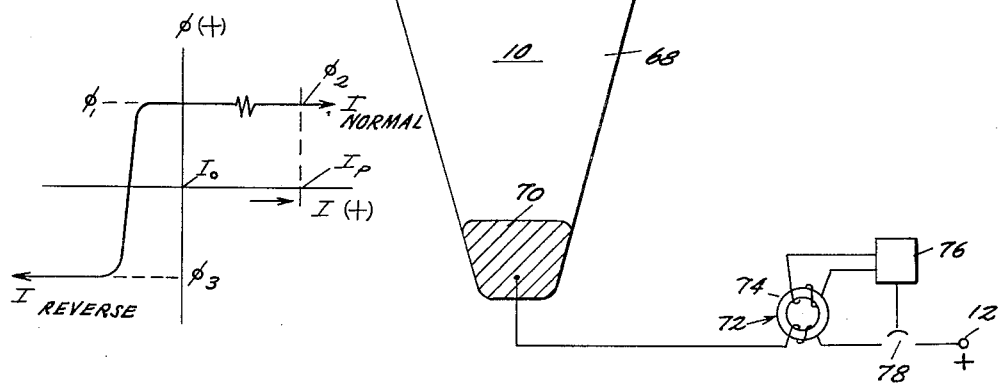
FIGURE 2 shows a flux-current characteristic of the saturable reactors of FIGURE 1.
Figure 3:
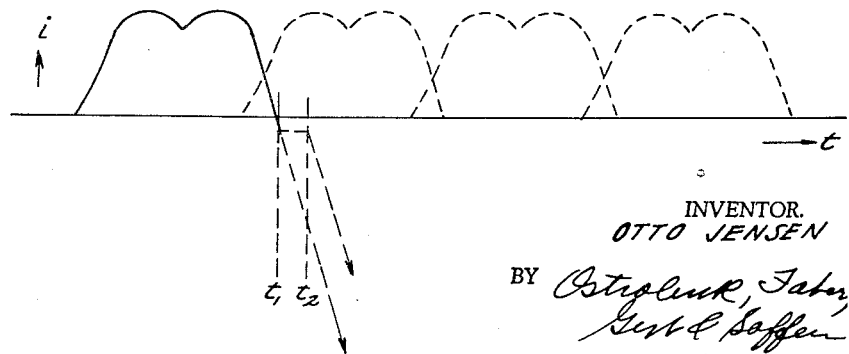
FIGURE 3 shows a current-time characteristic of the rectifier of FIGURE 1 during normal conditions, and when one anode carries reverse current.

The operation of my novel circuit may now be described in conjunction with FIGURES 2 and 3 where FIGURE 2 shows the flux current characteristic of any of the reactors 26, 28 or 30 while FIGURE 3 shows the current in each of the three anode leads of FIGURE 1.

More specifically, FIGURE 3 shows the current in phase A in solid lines and the currents of phases B and C in dotted lines. During normal operation, the current in any phase does not reverse, but is always positive or zero. Thus, the flux of any of the reactors 26, 28 or 30 changes from $\phi_1$ to $\phi_2$ corresponding to $I_0$ or zero current to $I_p$ or the peak current of the particular phase. By using highly saturable type material, the flux change from $\phi_1$ to $\phi_2$ is very small so that a negligibly small voltage develops across the auxiliary windings 44, 46 or 48. Therefore, during normal operating conditions, operating means 56, 58 and 60 are not energized.

When, however, the current in any phase reverses as shown in dotted lines for phase A in FIGURE 3, the flux of reactor core 32 goes through substantially its full flux change from $\phi_1$ to $\phi_3$ whereby an extremely high pulse voltage appears across auxiliary winding 44. During this flux change shown in FIGURE 3, as lasting for a time $t_2-t_1$, the anode current is held to the relatively small magnetizing current of reactor 26 and the operating means 56 which is energized from the voltage appearing across winding 44 can open interrupting means 50 within this step. In the event that anode breaker 50 is not fast enough to operate within the step of FIGURE 3, it still interrupts a much smaller current as may be seen from a comparison of the dot-dash line which shows the normal current rise and the dotted line which shows the delayed current rise due to the current step.

In the foregoing, I have described my invention only in connection with preferred embodiments thereof. Many variations and modifications of the principles of my invention within the scope of the description herein are obvious. Accordingly, I prefer to be bound not by specific disclosure herein but only by the appended claims.

I claim:
1. In a mercury arc rectifier comprising a plurality of anode leads connected to an A.-C. source, and a cathode lead connected to a D.-C. system, a plurality of saturable reactors and a plurality of high speed anode breakers having operating means associated therewith; one of each of said plurality of saturable reactors and one of each of said anode breakers being associated with a respective anode lead; each of said saturable reactors having an output winding connected in energizing relationship with respect to the operating means of the anode breaker associated with the same respective phase; each of said operating means being operable to operate its respective anode breaker to a disengaged position responsive to reversal of flux of its respective reactor, each of said reactors being of the highly saturable type; each of said reactors being constructed to remain unsaturated for a relatively long length of time when the current through said reactors reverses.

2. In a mercury arc rectifier comprising a plurality of anode leads connected to an A.-C. source, and a cathode lead connected to a D.-C. system, a plurality of saturable reactors and a plurality of high speed anode breakers having operating means associated therewith; one of each of said plurality of saturable reactors and one of each of said anode breakers being associated with a respective anode lead; each of said saturable reactors having an output winding connected in energizing relationship with respect to the operating means of the anode breaker associated with the same respective phase; each of said operating means being operable to operate its respective anode breaker to a disengaged position responsive to reversal of flux of its respective reactor, each of said reactors being of the highly saturable type; each of said reactors being constructed to remain unsaturated for a relatively long length of time after the current through said reactors reverses, each of said anode breakers and each of their respective saturable reactors being constructed to be operated to their disengaged position before the flux of its respective saturable reactor is fully reversed, said cathode lead having a step reactor and a cooperating circuit breaker associated therewith.

References Cited in the file of this patent
UNITED STATES PATENTS

| | | |
|---|---|---|
| 2,001,897 | West et al. | May 21, 1935 |
| 2,093,342 | Schmidt | Sept. 14, 1937 |
| 2,128,162 | Morton et al. | Aug. 23, 1938 |
| 2,169,866 | Bedford | Aug. 15, 1939 |
| 2,325,361 | Bany | July 27, 1943 |
| 2,510,616 | Bany et al. | June 6, 1950 |

FOREIGN PATENTS

| | | |
|---|---|---|
| 761,548 | Germany | Feb. 1, 1954 |

OTHER REFERENCES

"The Contact Rectifier" by D. R. Smith, published in Electrical Review (June 11, 1954), pages 1103 to 1105 relied on.